Dec. 27, 1955   W. G. RICHARDSON ET AL   2,728,444
SHEET TREATING APPARATUS
Filed Dec. 19, 1952   11 Sheets-Sheet 1

INVENTORS
William G. Richardson and
BY Charles R. Keep

Robert T. Palmer
Attorney

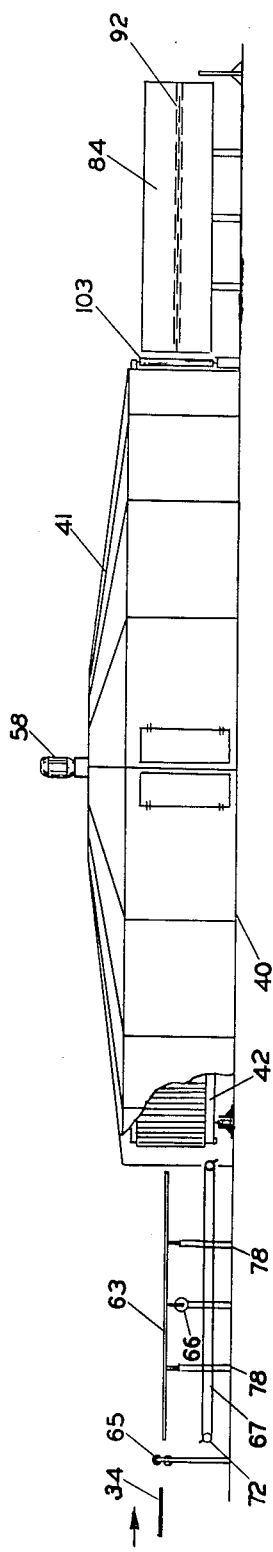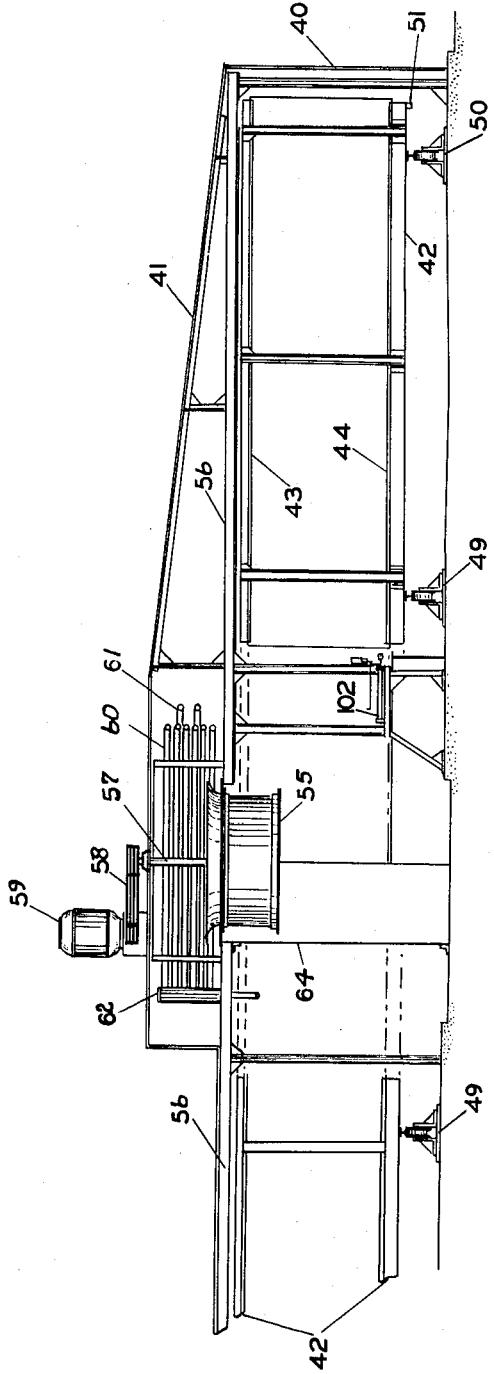

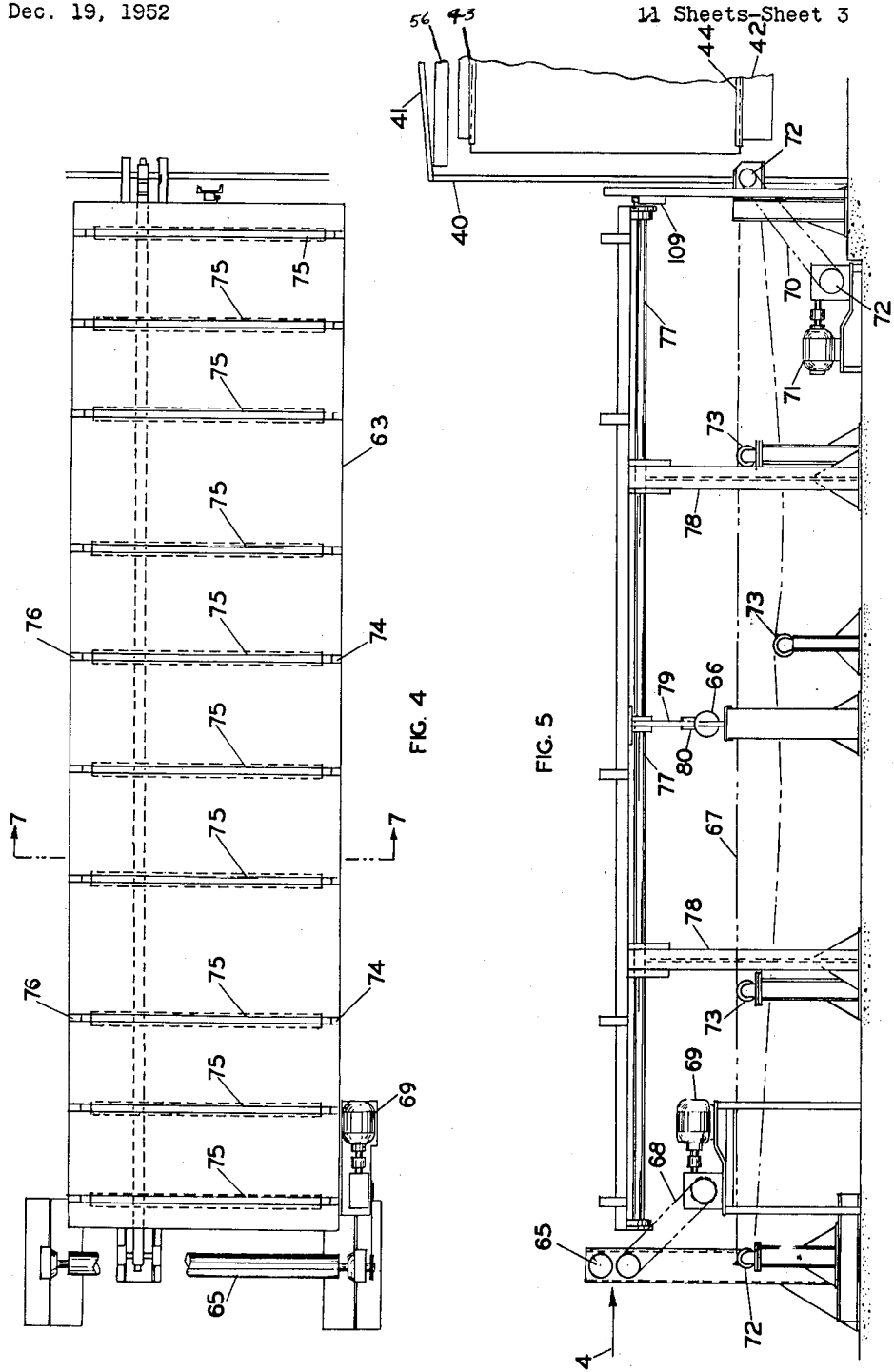

Dec. 27, 1955   W. G. RICHARDSON ET AL   2,728,444
SHEET TREATING APPARATUS
Filed Dec. 19, 1952   11 Sheets-Sheet 4
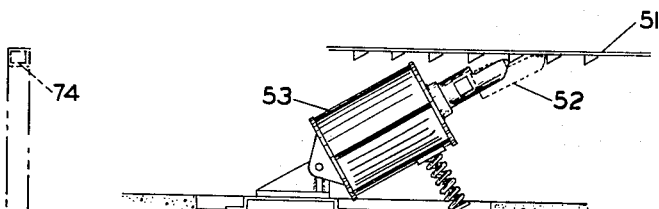
FIG. 6
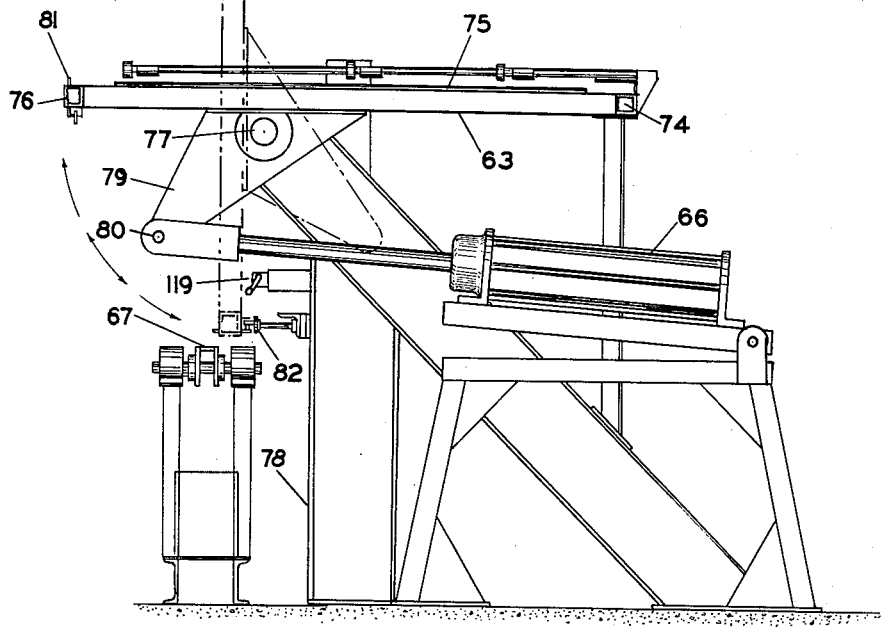
FIG. 7 (SEC. 7-7 FIG. 4)
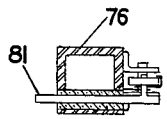
FIG. 10
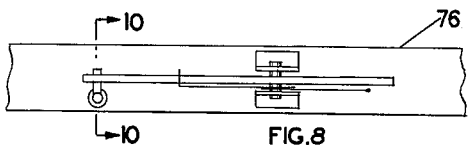
FIG. 8
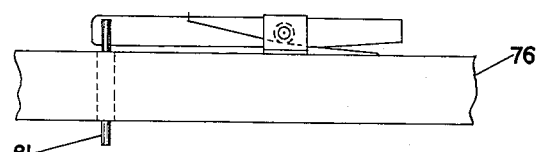
FIG. 9
INVENTORS
William G. Richardson and
BY Charles R. Keep
Robert J. Palmer
Attorney Dec. 27, 1955   W. G. RICHARDSON ET AL   2,728,444
SHEET TREATING APPARATUS
Filed Dec. 19, 1952   11 Sheets-Sheet 5
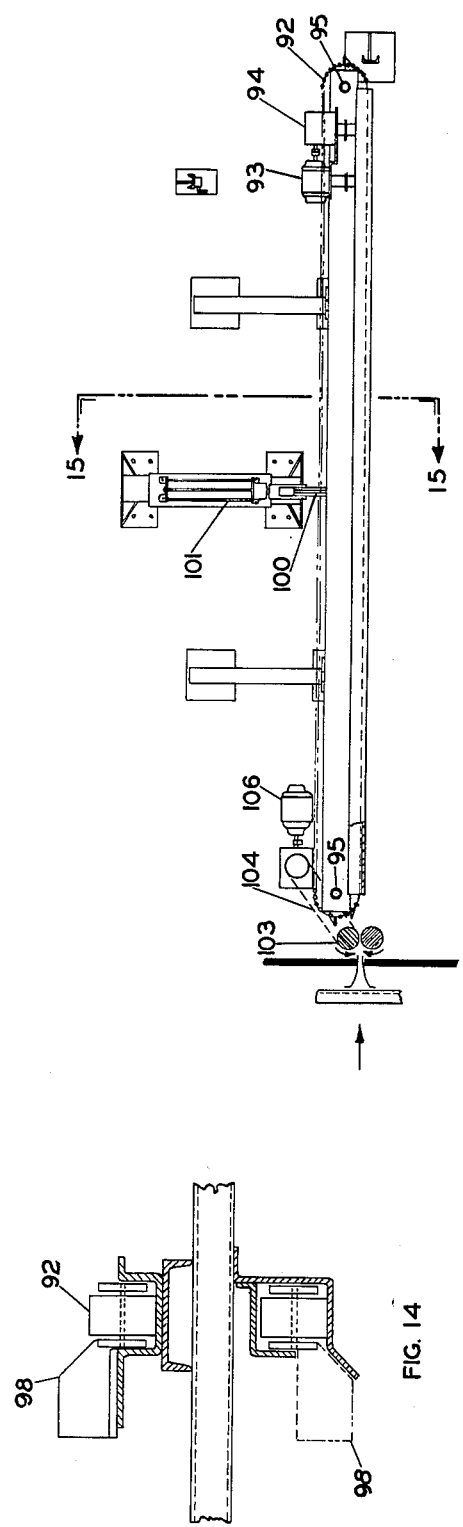
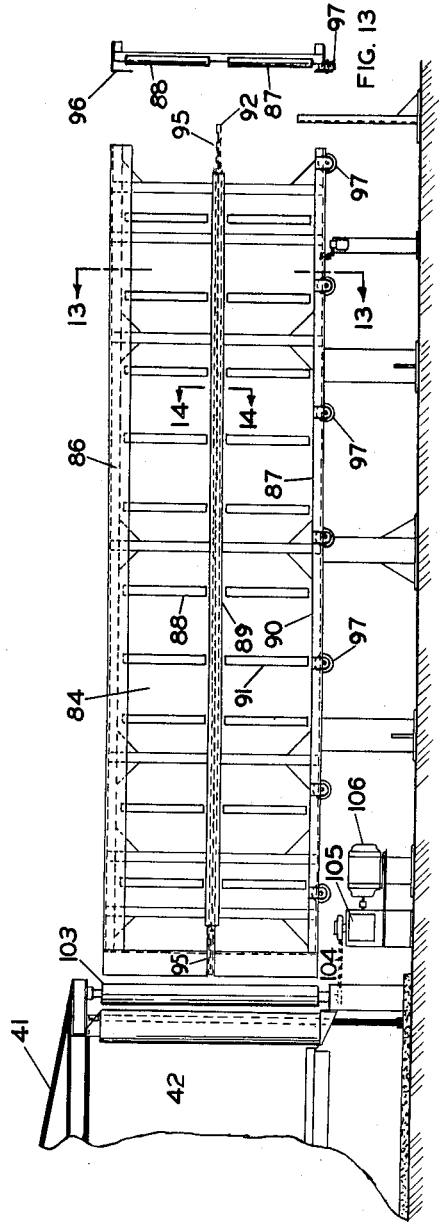
INVENTORS
William G. Richardson and
Charles R. Keep
BY Robert J. Palmer
Attorney Dec. 27, 1955  W. G. RICHARDSON ET AL.  2,728,444
SHEET TREATING APPARATUS
Filed Dec. 19, 1952  11 Sheets-Sheet 6

INVENTORS
William G. Richardson and
Charles R. Keep
BY Robert J. Palmer
Attorney

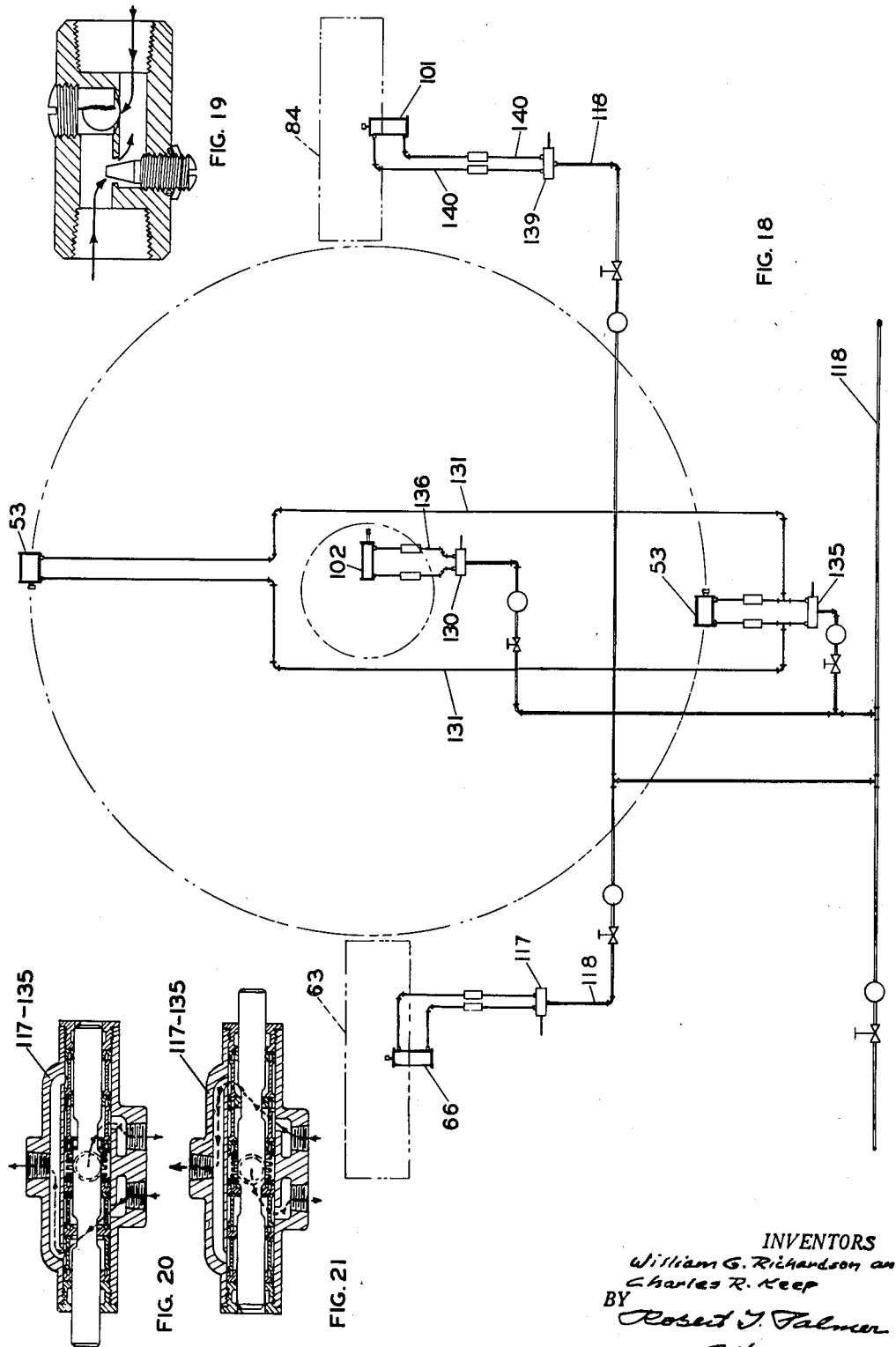

Dec. 27, 1955  W. G. RICHARDSON ET AL  2,728,444
SHEET TREATING APPARATUS

Filed Dec. 19, 1952  11 Sheets-Sheet 8

INVENTORS
William G. Richardson and
Charles R. Keep
BY Robert J. Palmer
Attorney Dec. 27, 1955  W. G. RICHARDSON ET AL  2,728,444
SHEET TREATING APPARATUS Filed Dec. 19, 1952   11 Sheets-Sheet 9

INVENTORS
William G. Richardson and
Charles R. Keep
BY
Robert J. Palmer
Attorney Dec. 27, 1955  W. G. RICHARDSON ET AL  2,728,444
SHEET TREATING APPARATUS Filed Dec. 19, 1952  11 Sheets-Sheet 10

110 VOLTS

INVENTORS
William G. Richardson and
Charles R. Keep
BY
Robert J. Palmer
Attorney Dec. 27, 1955    W. G. RICHARDSON ET AL    2,728,444
SHEET TREATING APPARATUS Filed Dec. 19, 1952    11 Sheets-Sheet 11

INVENTORS
William G. Richardson and
Charles R. Keep
BY Robert J. Palmer
Attorney ated Dec. 27, 1955

2,728,444

SHEET TREATING APPARATUS

William G. Richardson, Weston, and Charles R. Keep, Norwood, Mass.

Application December 19, 1952, Serial No. 326,922

9 Claims. (Cl. 198—33)

This invention relates to turn-table assemblies for handling large flat articles, and relates more particularly to turn-table assemblies for handling hard-board sheets for humidification after pressing.

Hard-board sheets such as "Masonite" are fabricated in heated presses from which they emerge in dry condition. If they are then stacked or otherwise stored without controlled humidification, they will absorb moisture from the air, unevenly, and will tend to warp. It is therefore, necessary that such a sheet gain from 5% to 7% hygroscopic moisture immediately after pressing, evenly throughout the sheet.

It is preferable to humidify the sheets while they are supported in vertical positions, since if they are inclined during humidification, their supports, which usually are of metal, will mark the faces of the sheets because of condensation on the metal surfaces. Prior humidifiers for humidifying such sheets have involved manual handling resulting in high handling expense, and in low production. Humidifiers embodying this invention are automatically operated, and not only are more efficient but occupy less space than prior humidifiers.

This invention provides an efficient, compact turn-table assembly which receives a sheet to be humidified or otherwise treated, from a de-screening table or other source, on a tilt-table in a horizontal position, following which the tilt-table automatically tilts to a vertical position, and the sheet thereon is automatically ejected onto a turn-table. The turn-table automatically stops rotating to receive an injected sheet, and at the same time to eject a treated sheet which has previously been injected and treated during rotation of the turn-table. After a sheet is injected and another sheet ejected, the turn-table automatically rotates a few inches to a position for receiving the next sheet. The sheets while on the turn-table are treated as by being humidified with moist heated air which is circulated through the housing enclosing the turn-table. Each sheet as it is ejected from the turn-table is received on a tilt-table in a vertical position, following which the tilt-table automatically tilts to a horizontal position. The sheet is then automatically removed from the tilt-table and conveyed to storage or further treatment.

This invention also provides automatically operated controls which prevent any step in the sheet handling procedure from starting until the preceding step has been successfully completed.

In one embodiment of the invention in actual use in which the sheets on the turn-table are humidified during 180° rotation of the turn-table, there are 238 sheets on the turn-table between one being injected and another being ejected.

An object of the invention is to provide an automatically operated turn-table assembly for receiving sheets in a horizontal position, for treating the sheets in a vertical position, and for disposing of the sheets after treatment, in a horizontal position.

Another object of the invention is to provide a humidifier for flat sheets which is more efficient than, which has increased production over, and which occupies less space than prior humidifiers for such sheets.

The invention will now be described with reference to the drawings, of which:

Fig. 2 is a side elevation of the assembly of Fig. 1, with a portion of the roof and side walls removed;

Fig. 3 is an enlarged sectional view along the lines 3—3 of Fig. 1;

Fig. 4 is an enlarged plan view looking downwardly on the tilt-table and conveyor at the entrance to the humidifier;

Fig. 5 is a side elevation of the tilt-table and conveyor shown by Fig. 4;

Fig. 6 is a side elevation of the mechanism for moving the turn-table;

Fig. 7 is an end elevation of the tilt-table shown by Figs. 4 and 5;

Fig. 8 is an enlarged side elevation of the sheet releases used with the tilt-table shown by Figs. 4, 5 and 6;

Fig. 9 is a plan view looking downwardly upon one of the sheet releases used with the tilt-table of Figs. 4, 5 and 6;

Fig. 10 is an end elevational view along the lines 10—10 of Fig. 8;

Fig. 11 is a plan view looking downwardly upon the tilt-table at the outlet of the turn-table, together with its tilting mechanism, and its associated conveyor;

Fig 12 is a side elevation of the tilt-table of Fig. 11;

Fig. 13 is an end elevation of the tilt-table of Figs. 11 and 12;

Fig. 14 is a sectional view along the lines 14—14 of Fig. 12;

Fig. 18 is a schematic layout of the pneumatic system used;

Fig. 19 is a cross sectional view through one of the control valves used in the system of Fig. 18;

Fig. 20 is a cross sectional view through another of the control valves used in the system of Fig. 18;

Fig. 21 is a view similar to Fig. 20 except that the valve is shown in the opposite position;

Figure 29:
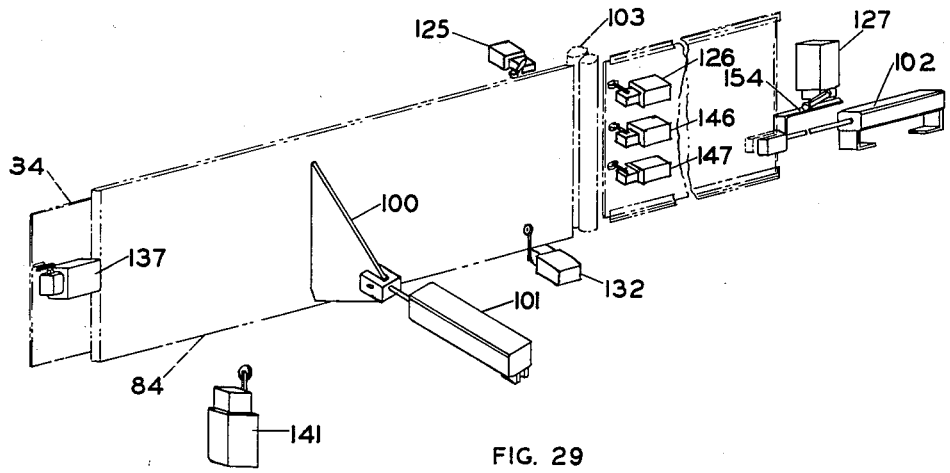
Figure 30:
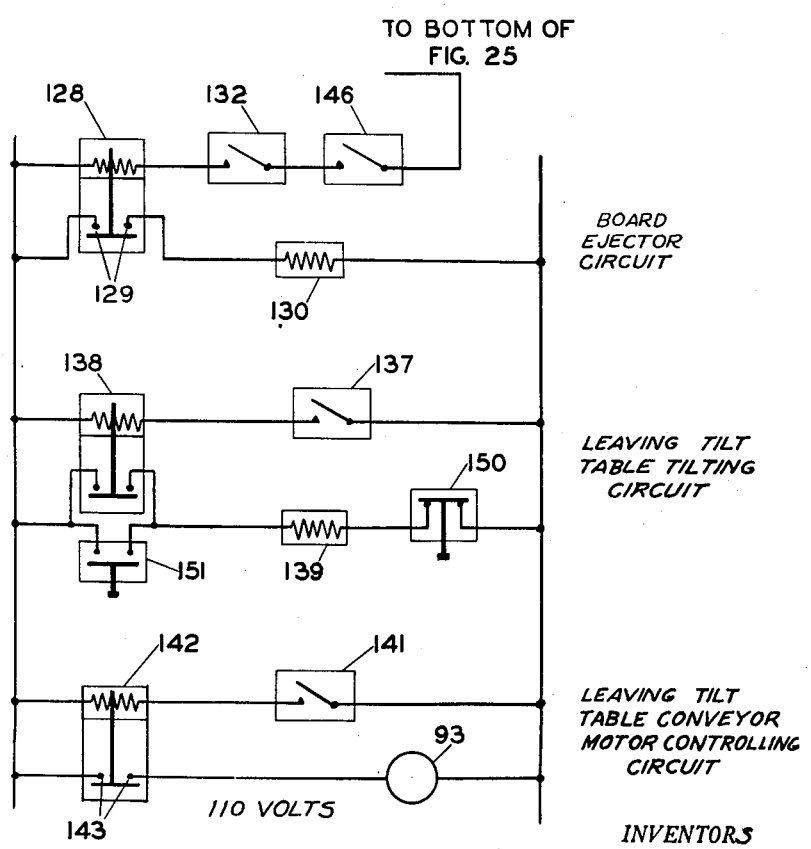

Fig. 29 is a pictorial view showing the tilt-table at the outlet of the humidifier, with its pneumatic tilting mechanism, limit switch, nip-rolls, and turn-table channel at outlet position with a sheet being ejected by air ejector motor, and limit switch, and Fig. 30 is a circuit schematic showing the circuit controlling the sheet ejector motor, the circuit controlling the positioning of the tilt-table at the outlet of the humidifier, and the circuit for controlling the motor driving the sheet conveying chain on the tilt-table at the outlet of the humidifier.

The humidifier includes a cylindrical housing 40 having the pitched roof 41. The turn-table 42 consisting of the radially extending upper channels 43, and radially extending lower channels 44 secured to the outer and inner circular frame members 45 and 46 respectively, is supported for rotation upon the lower inner and outer circular frame members 47 and 48 respectively, which rest upon the inner and outer rollers 49 and 50 respectively.

The circular ratchet wheel 51 is attached to the bottom of the channel 48, and is engaged by the ratchet 52 driven by the air piston 53 for rotating the turn-table.

The propeller fan 55 is supported from the upper frame members 56 with its rotary shaft extending vertically at the center of the turn-table, and is driven by the electric motor 59 through the V-belt 58 and associated pulleys.

The circular steam heating coils 60 are arranged between the inlet of the fan 55 and the roof 41, concentric with the fan. Several of the coils have the steam nozzles 61 which moisten the air moved by the fan, with steam supplied through the header 62 to the coils.

In the illustrated embodiment of the invention, the sheets are humidified during 180° only, rotation of the turn-table. Therefore, the semi-cylindrical baffle 64 extends vertically from the floor of the humidifier, around the fan 55 at the back side of the humidifier, for preventing the heated and humidified air from circulating through the back half of the humidifier housing where there are no sheets on the turn-table.

The tilt-table 63 which normally is in a horizontal position for receiving an incoming sheet 34 advanced by the nip-rolls 65 upon the tilt-table, is tilted to a vertical position by the air piston 66. The chain conveyor 67 underneath the tilt-table 63 is contacted by the lower edge of a sheet on the tilt-table, and serves to inject the sheet onto the turn-table. The nip-rolls 65 are driven through the belt 68 and associated pulleys by the electric motor 69.

The conveyor 67 is driven through the belt 70 and associated pulleys 72 by the electric motor 71, and rotates around the end sprockets 73 on which it is supported.

The tilt-table 63 consists of the box beam 74 along one of its sides, which is its back side when it is in a horizontal position, and is its upper side when it is in its vertical position. The rolls 75 are journalled at one end in the box beam 74, and at their opposite ends in the box beam 76. The tilt-table 63 has attached to its transverse ends the rod 77 which is rotatably supported by the vertical columns 78. Attached to the rod centrally between the columns 78 is the arm 79 which is pivoted at 80 to the air piston 66 which tilts the tilt-table 63 from its horizontal to its vertical position and vice versa.

A sheet 34 when in position on the tilt-table 63 is held at one edge between one side of the box beam 74 and rolls 75 at one end, and rests against the sheet releases 81 when the tilt-table is in its horizontal position, and which are sprung by the stops 82 when the tilt-table reaches its vertical position, permitting the sheet to drop onto the conveyor 67. The sheet releases 81 which are shown in enlarged detail by Figs. 8, 9 and 10 of the drawings, are journalled in the members 76.

The tilt-table 84 at the outlet of the humidifier, is normally in a vertical position for receiving a sheet ejected from the turn-table, and is tilted to a horizontal position after receiving a sheet. It comprises longitudinally extending members 86 and 87 in which the rolls 88 and 91 are journalled. As illustrated by Fig. 12, the corresponding rolls 88 and 91 are spaced apart and are in axial alignment. The conveyor chain 92 driven by the motor 93 through the gear box 94, rotates over the sprockets 95 at the ends of the tilt-table 84, and passes between the rolls 88 and 91 along the longitudinal center of the tilt-table 84.

The longitudinally extending member 86 along one side of the tilt-table 84, the upper side when the tilt-table is in its vertical position, has the channel 96 attached thereto, and which has a portion spaced from and extending parallel to the rolls 88 forming a space for receiving the upper end of a sheet. The lower end of the sheet would rest on the rolls 97 at the opposite longitudinal side of the tilt-table, and which are journalled for rotation in the longitudinally extending member 90.

The chain 92 has the dog 98 thereon which contacts the ends of a sheet on the tilt-table 84, and which moves it from the tilt-table as will be described later.

The tilt-table 84 is pivoted on the longitudinally extending rod 99, and is tilted from vertical to horizontal position by the arm 100 conneced to the air piston 101.

The air piston 102 at the center of the turn-table contacts the inner vertical side of a sheet lined up with the exit from the turn-table, and serves to eject a humidified sheet from the turn-table.

The vertically extending nip-rolls 103 at the exit from the turn-table and between same and the tilt-table 84, are driven by the chain 104 and gear box 105 connected to the electric motor 106, and serve to remove the sheets ejected from the turn-table onto the tilt-table 84.

*Operation*

Referring first to Figs. 1, 2, 4, 5, 7, 24 and 25 of the drawings, the tilt-table 63 at the entrance to the turn-table is normally in a horizontal position where it closes a switch 107 which is connected in series with the contact 108 and contact 109 of the switch 110, the energizing winding of the relay 111 and the electric supply mains 112. The switch arm 109 will normally touch the contact 108 at this time so that the circuit described in the foregoing will be completed to energize the relay 111 causing it to pull up its armature and to start the electric motor 69 which then rotates the nip-rolls 65 which advance an incoming sheet 34 onto the tilt-table 63. The arm 109 of the switch 110 is moved away from the contact 108 when the sheet is in its proper position on the tilt-table, thereby stopping the nip-rolls 65.

Figure 1:
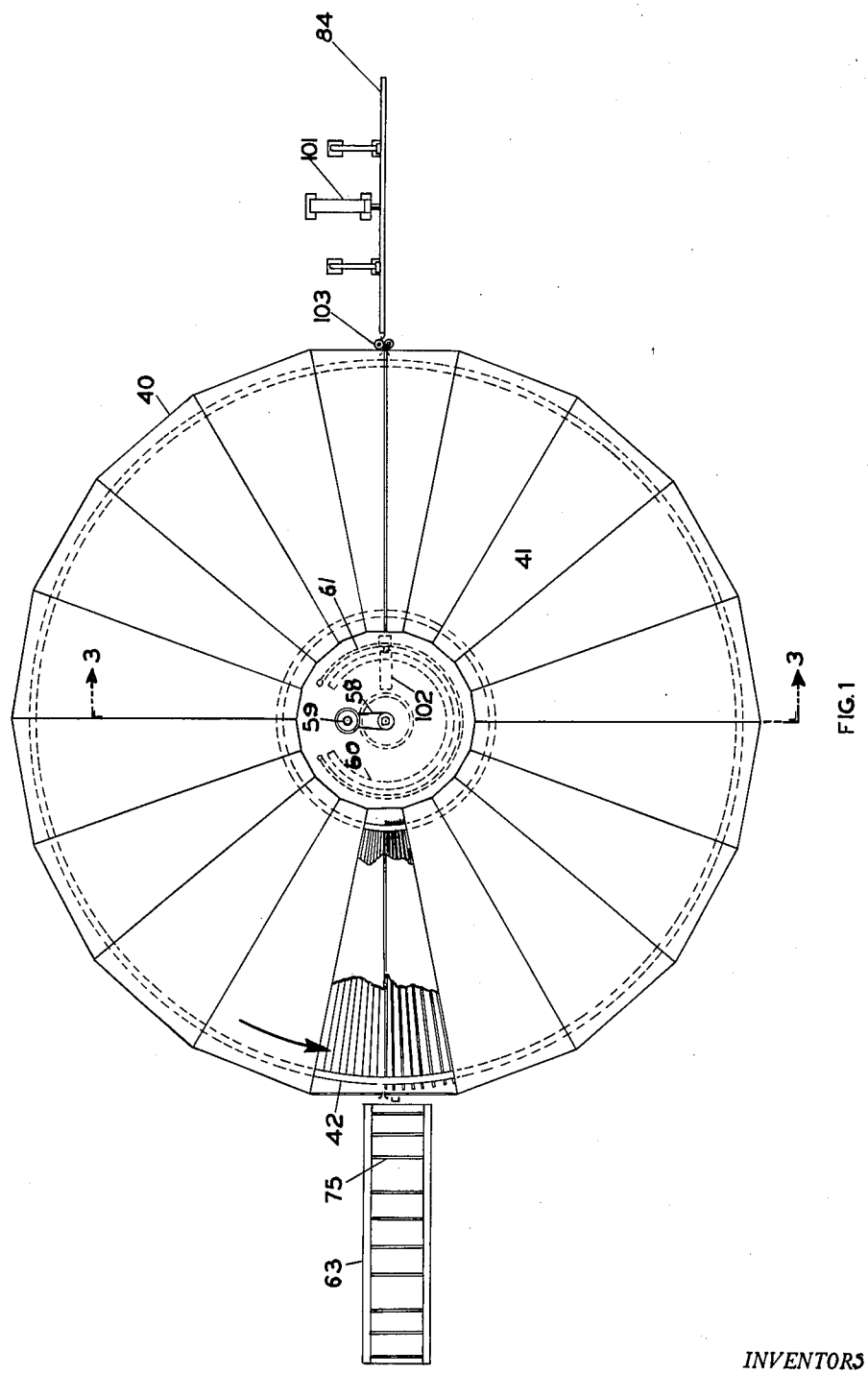
Fig. 1 is a plan view looking downwardly upon a turn-table assembly embodying this invention.
Figures 15, 16, 17:
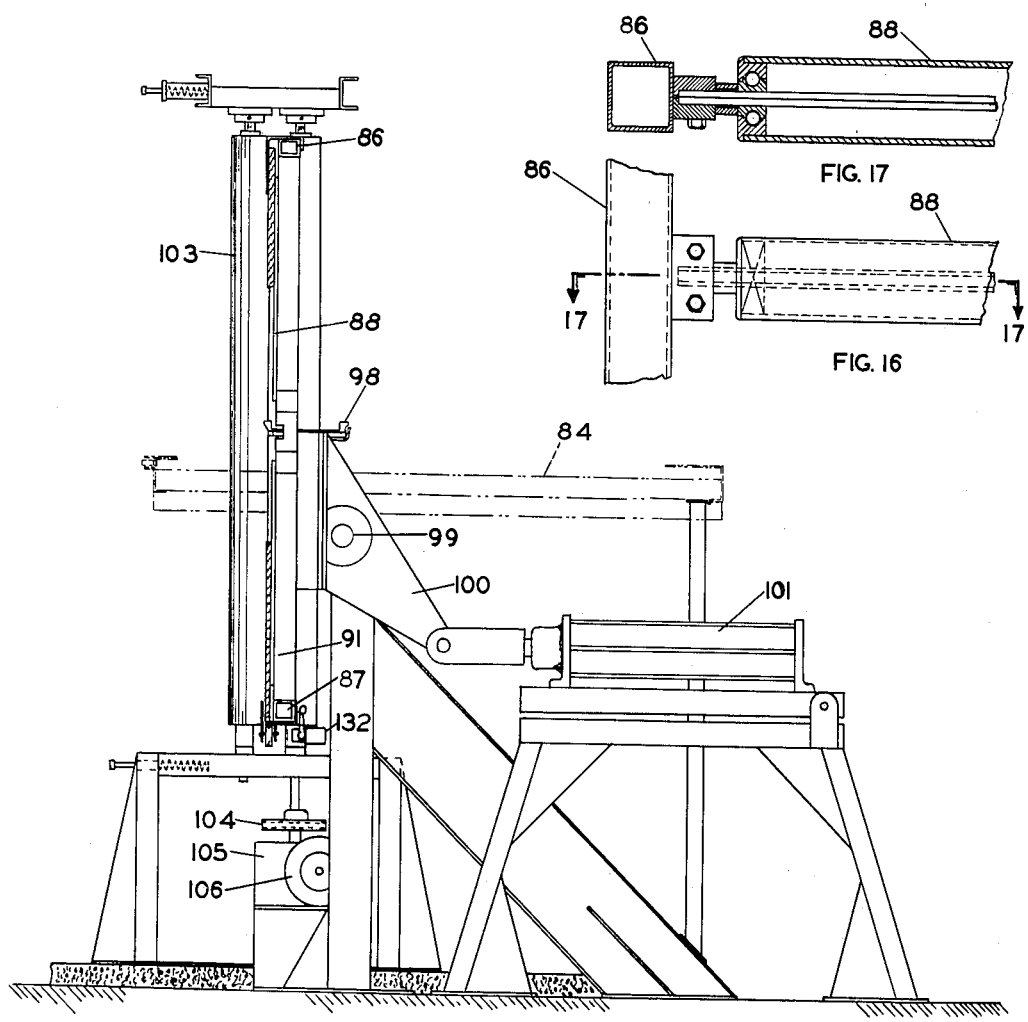
Fig. 15 is an end view of the tilting mechanism of Fig. 11.
Fig. 16 is an enlarged view showing the rolls mounting means used in the tilt-tables shown by Figs. 4 and 11.
Fig. 17 is a sectional view along the lines 17—17 of Fig. 16.
Figure 22:
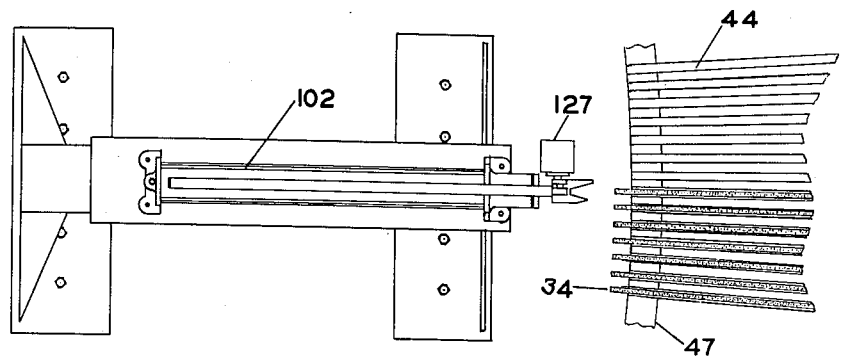
Fig. 22 is a plan view looking downwardly upon the air motor used for ejecting sheets from the turn-table.
Figure 23:
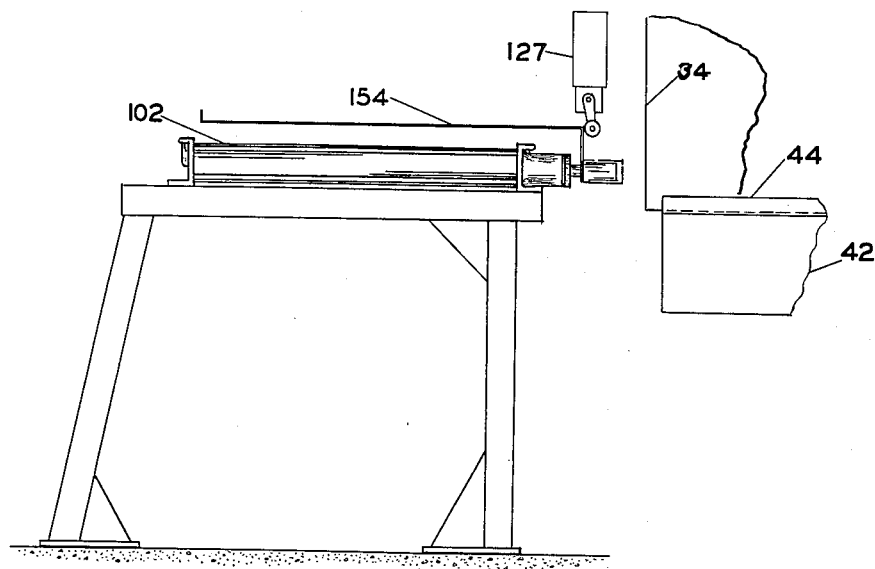
Fig. 23 is a side elevation of the ejector of Fig. 22.
Figure 24:
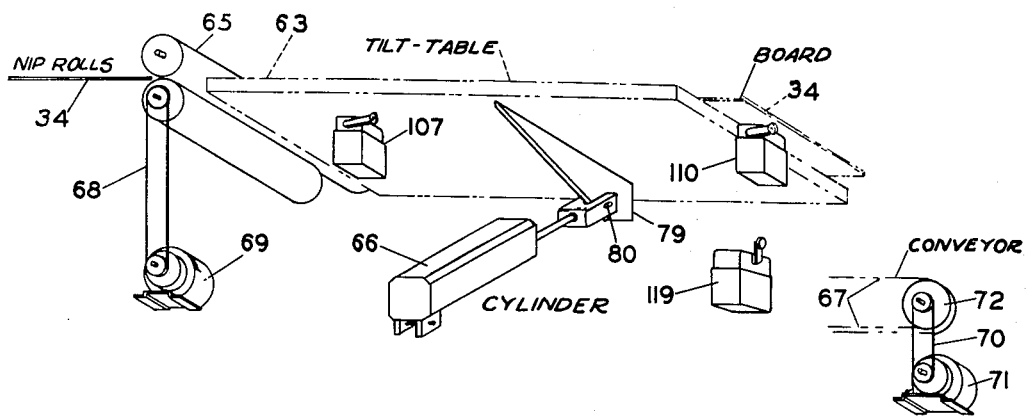
Fig. 24 is a pictorial view of the entering tilt-table, including entering nip rolls with driving motor, pneumatic tilting mechanism connected to limit switches, and entering conveyor with its driving motor.
Figure 25:
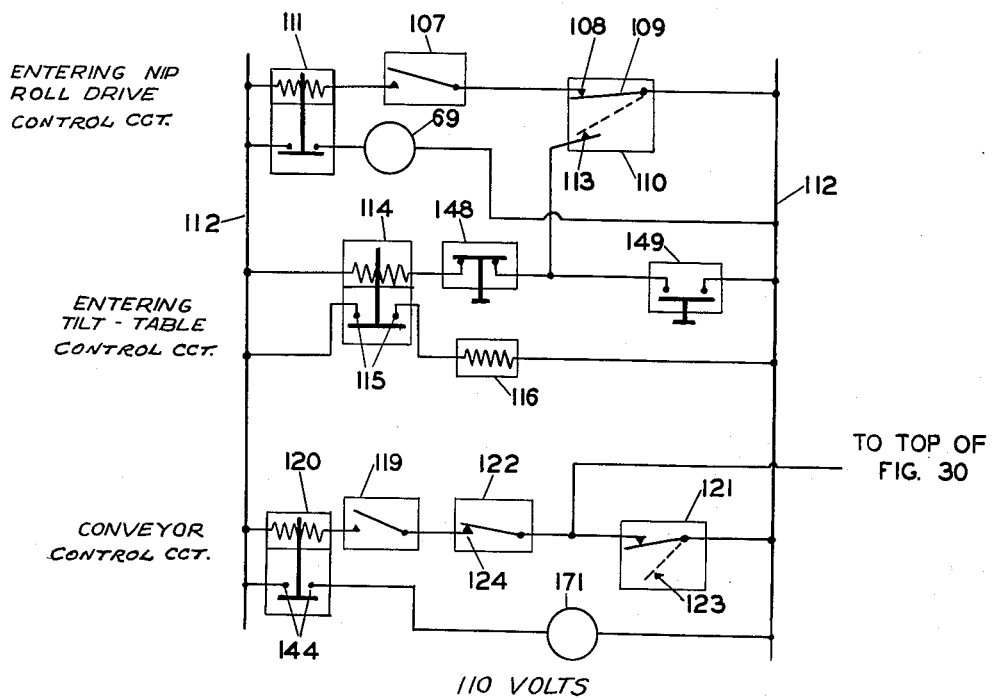
Fig. 25 is a circuit schematic showing the control circuit for the entering nip-roll drive, the circuit controlling the pneumatic mechanism used to position the entering tilt-table, and the circuit controlling the entering conveyor motor.

Referring now to Fig. 25, at the same time the switch arm 109 is moved away from the contact 108, it is moved against the contact 113, closing a circuit which includes the energizing winding of the relay 114 and the electric mains, causing the relay 114 to pull-up its armature against the contact 115 which connects the solenoid 116 to the electric mains. This causes the solenoid to become energized and to open the valve 117 (Fig. 18) in the air line 118, admitting air into the piston 66 (Figs. 7, 18 and 24) which then moves the tilt-table 63 from its horizontal to its vertical position.

Referring now to Figs. 7 and 25, when the tilt-table 63 reaches its vertical position, it closes the switch 119 which connects the relay 120 and the series connected switches 121 and 122 to the electric mains, causing the relay 120 to move its armature against the contact 144, closing the circuit energizing the motor 71 which then rotates the conveyor 67 for advancing the sheet onto the turn-table when the switch 121 is closed to contact 123.

Upon nearing the end of its travel onto the turntable, the leading edge of the sheet 34 contacts the actuating arms of the switches 122 normally closed, and switch 145 normally open. The switch 122 is opened and de-energizes relay 120, stopping the conveyor drive motor 71. The switch 145 is closed and energizes relay 133 through series connected switches 125 and 127.

The sheet ejected from the tilt-table 63 by this time will have released the switch arm 109 of the switch 110, first opening the circuit of the solenoid 116, causing it to tilt the tilt-table 63 back to its horizontal position, and next closing the circuit of the relay 111 and again energizing the motor 69 causing it to rotate the nip-rolls 65 for advancing the next incoming sheet 34 onto the tilt-table 63.

After a sheet on the turn-table engages the switch 122, it picks-up and closes switch 145 connected in series with the normally closed switches 125 and 127, the relay 133 and the mains to the solenoid 135, energizing the latter and causing it to open a valve in the compressed air line 131, admitting air to the piston 53 (Figs. 6 and 18) causing it to start advancing the turntable to its next position.

The safety switch 125 is opened by a sheet being ejected from the turn-table, and therefore prevents rotation of the turn-table while a sheet is being ejected.

The safety switch 126 is opened when a sheet has not been ejected and has passed the exit opening from the turn-table, and stops the turn-table if this has happened.

The safety switch 127 is opened by the guide-bar 154 of the sheet ejecting cylinder 102 (Figs. 3, 22, 23 and 29) when the piston 53 has not returned from its sheet ejecting position, and prevents the turn-table from rotating until the piston has returned.

During rotation of the turn-table, the switch 122 (Figs. 25 and 27) is returned to its normal position for closing the energizing circuit of the relay 120, thus energizing the conveyor motor 71 which, however, will not start unless the tilt-table 63 is in its vertical position closing switch 119.

At the same time that switch 122 is returned to its normal position, switch 145 (Fig. 27) is also returned to its normal position which would open the circuit energizing the relay 133 unless the switch 121 closes before the opening of switch 145. The switch 121 in its normal position holds the relay 128 energized until the switch 121 is engaged by the next stop lug or cam on the turn-table.

Figure 26:
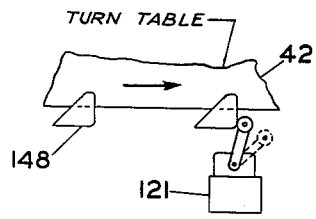
Fig. 26 is a fragmentary view of the turn-table with indexing cams and limit switch.

As illustrated by Fig. 26, at each turn-table stopping position, a lug or cam on the turn-table will operate the switch 121 causing it to close a series circuit including the normally closed switches 132 and 146, the relay 128 and the electric mains, causing the relay 128 to close the contacts 129 connecting the solenoid 130 to the electric mains, energizing the solenoid and causing it to open a valve in the compressed air line 136 to the cylinder 102. This causes the cylinder 102 to eject a sheet from the turn-table, between the continuously rotated nip-rolls 103 which advance the ejected sheet onto the tilt-table 84.

The switch 132 is closed by the tilt-table 84 when the latter is in its vertical position, and prevents a sheet from being ejected by the cylinder 102 unless the tilt-table 84 is vertical.

As illustrated by Fig. 29, when the sheet on the tilt-table 84 reaches the end of its travel, it closes the switch 137 which connects the relay 138 to the electric mains, causing it to close the energizing circuit of the solenoid 139. This energizes the latter causing it to reverse the flow through the compressed air line 140 to the cylinder 101 which tilts the tilt-table 84 to its horizontal position. The tilt-table 84 then opens the switch 132 which de-energizes the relay 133. This causes the solenoid 135 to reverse the flow through the compressed air line to the cylinder 101 which withdraws its piston. This resets the safety switch 127 which together with the normally closed switch 125 and the switch 145 which is closed by a sheet entering the turn-table, places the turn-table advancing circuit in position to start the next cycle.

With reference to Fig. 30, when the tilt-table 84 reaches its horizontal position, it closes the switch 141 which connects the relay 142 to the electric mains, causing it to close the contacts 143 and to connect the motor 93 which rotates the conveyor chain 92 (Figs. 11 and 14) to convey the sheet on the tilt-table 84 to a saw table or elsewhere. When the sheet leaves the tilt-table 84, the switch 137 is opened and the tilt-table returns to a vertical position, opening the switch 141 and stopping the conveyor chain 92.

Many of the operations described in the foregoing take place simultaneously. The incoming sheet is removed from production onto the tilt-table 63 at the same time the outgoing sheet is moved from the tilt-table 84. The tilt-table 63 is moved from its horizontal position to its vertical position at the same time the tilt-table 84 is moved from its vertical to its horizontal position. An incoming sheet is injected onto the turn-table at the same time an outgoing sheet is ejected from the turn-table, the turn-table being stationary at this time. The other operations described in the foregoing, take place while the turn-table is rotating from one position to the next.

Figure 27:
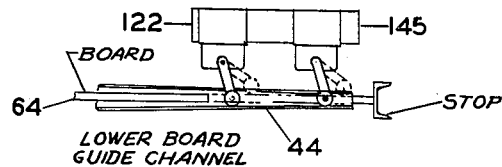
Fig. 27 is a fragmentary view of one turn-table channel with a sheet entering and about to actuate limit switches.
Figure 28:
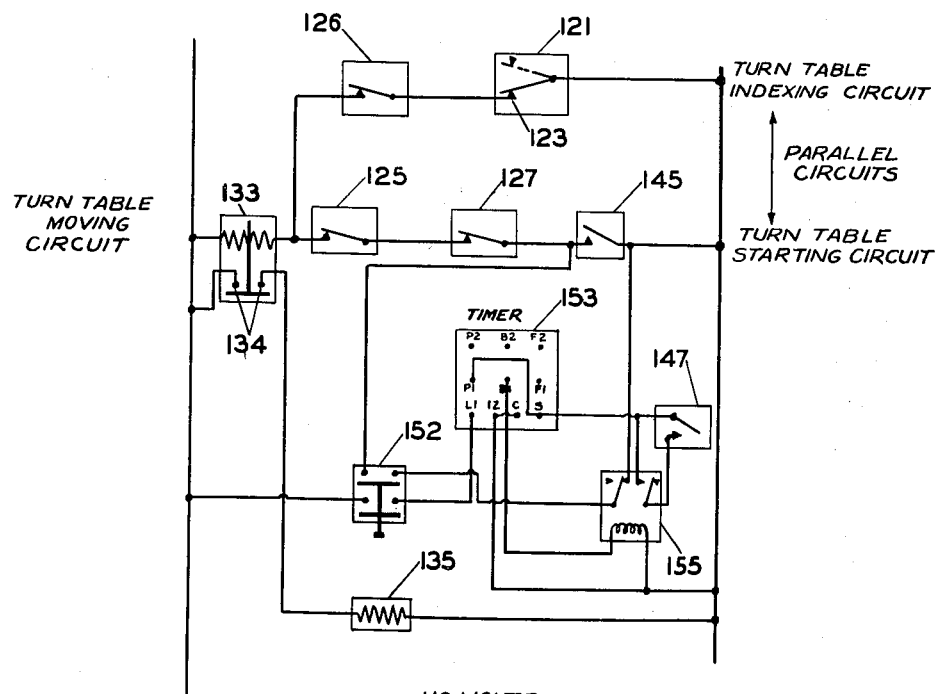
Fig. 28 is a circuit schematic showing the circuit controlling the moving and indexing on the turn-table.

In order to empty the turn-table of treated sheets after the last production sheet has been injected onto the turn-table, a timer 153 (Fig. 28) is shunted across switch 145 (Fig. 27). This timer takes over the function normally performed by the entering sheets in closing switch 145, and is triggered to start each cycle, by switch 147 (Fig. 28) which is actuated by each sheet as it approaches the position to be ejected. The timer is put into operation by closing switch 152 (Fig. 28).

The switches 148 and 149 (Fig. 25) and the switches 150 and 151 (Fig. 30) are of the momentary push button type, and permit the operator to change the position of either tilt-table at will.

While the invention was conceived for, and is being used for, the humidification of fabricated hardboard sheets, it may be used, of course, for other treatments of other sheets or sheet-like materials.

While one embodiment of the invention has been described for the purpose of illustration, it should be understood that the invention is not limited to the exact apparatus and arrangement of apparatus illustrated, since modifications thereof may be suggested by those skilled in the art, without departure from the essence of the invention.

What is claimed is:

1. Sheet treating apparatus comprising a rotary turn-table, a plurality of sheet supporting means on said turn-table for supporting a plurality of sheets radially and vertically thereon, a normally horizontal tilt-table, means for feeding a sheet to be treated onto said tilt-table and for then placing said tilt-table in a vertical position, means for ejecting a sheet from said tilt-table onto said turn-table into one of said sheet supporting means, means for rotating said turn-table, a second normally vertical tilt-table, means for stopping said turn-table, and means for ejecting a sheet from said turn-table onto said second tilt-table and for then placing said second tilt-table in a horizontal position.

2. Sheet treating apparatus as claimed in claim 1 in which means operated by a sheet on the first mentioned tilt-table is provided for preventing the first mentioned tilt-table from being moved from a horizontal to a vertical position in the absence of a sheet thereon.

3. Sheet treating apparatus as claimed in claim 1 in which means operated by a sheet on the first mentioned tilt-table prevents the means for feeding a sheet thereon from operating while there is a sheet thereon.

4. Sheet treating apparatus as claimed in claim 1 in which means operated by the turn-table prevents the means for ejecting a sheet from the first mentioned tilt-table onto the turn-table except when one of the sheet supporting means is in alignment with the first mentioned tilt-table.

5. Sheet treating means as claimed in claim 1 in which means operated by a sheet ejected onto the turn-table from the first mentioned tilt-table operates the means for rotating the turn-table.

6. Sheet treating apparatus as claimed in claim 1 in which means operated by a sheet ejected onto the turn-table from the first mentioned tilt-table stops the means for ejecting the sheet onto the turn-table and restores the first mentioned tilt-table to a horizontal position.

7. Sheet treating apparatus as claimed in claim 1 in which means operated by the turn-table starts the means for ejecting a sheet from the turn-table onto the second tilt-table.

8. Sheet treating apparatus as claimed in claim 1 in which means operated by a sheet ejected onto the second tilt-table moves the second tilt-table to a horizontal position.

9. Sheet treating apparatus as claimed in claim 1 in which means operated by the second tilt-table when it reaches a horizontal position removes the sheet from the second tilt-table.

References Cited in the file of this patent

UNITED STATES PATENTS

| | | |
|---|---|---|
| 1,335,221 | Christensen | Mar. 30, 1920 |
| 1,462,546 | Hillmann | July 24, 1923 |
| 1,558,835 | Cathcart | Oct. 27, 1925 |
| 1,567,153 | Kelly | Dec. 29, 1925 |
| 1,581,526 | Willsea | Apr. 20, 1926 |
| 1,937,699 | Hoyt | Dec. 5, 1933 |
| 1,983,755 | Heichert | Dec. 11, 1934 |
| 2,019,972 | Hormel | Nov. 5, 1935 |
| 2,187,073 | Bishop | Jan. 16, 1940 |
| 2,373,149 | Strickler | Apr. 10, 1945 |